(12) United States Patent
Wulff et al.

(10) Patent No.: US 10,759,528 B2
(45) Date of Patent: Sep. 1, 2020

(54) MODEL FOLLOWING CONTROL FOR TORQUE AND ROTOR SPEED

(71) Applicant: Sikorsky Aircraft Corporation, Stratford, CT (US)

(72) Inventors: Ole Wulff, Antonia, CT (US); Derek H. Geiger, Wilton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 348 days.

(21) Appl. No.: 15/705,385

(22) Filed: Sep. 15, 2017

(65) Prior Publication Data
US 2018/0134380 A1    May 17, 2018

Related U.S. Application Data

(60) Provisional application No. 62/422,224, filed on Nov. 15, 2016.

(51) Int. Cl.
| B64C 27/57 | (2006.01) |
| B64C 27/06 | (2006.01) |
| B64C 27/04 | (2006.01) |
| B64D 31/06 | (2006.01) |

(52) U.S. Cl.
CPC ............. *B64C 27/57* (2013.01); *B64C 27/04* (2013.01); *B64C 27/06* (2013.01); *B64D 31/06* (2013.01)

(58) Field of Classification Search
CPC ......... B64C 27/57; B64C 27/04; B64C 27/06; B64D 31/06
See application file for complete search history.

(56) References Cited

U.S. PATENT DOCUMENTS

| 2,769,303 | A | * | 11/1956 | Lucia | F02B 33/00 60/608 |
| 6,879,885 | B2 | | 4/2005 | Driscoll et al. | |
| 7,219,040 | B2 | * | 5/2007 | Renou | F02C 9/28 700/177 |
| 7,931,231 | B2 | | 4/2011 | Cherepinsky et al. | |
| 9,758,242 | B2 | * | 9/2017 | Wulff | B64C 27/10 |
| 10,025,320 | B2 | * | 7/2018 | Sahasrabudhe | G05D 1/0858 |
| 10,099,777 | B2 | * | 10/2018 | Eller | B64C 13/18 |
| 10,351,225 | B2 | * | 7/2019 | Spoldi | G05D 1/0061 |
| 2015/0028152 | A1 | * | 1/2015 | Eller | B64C 27/001 244/17.13 |
| 2016/0208639 | A1 | * | 7/2016 | Cai | F01D 21/003 |
| 2016/0208717 | A1 | | 7/2016 | Cai | |

* cited by examiner

*Primary Examiner* — Assres H Woldemaryam
(74) *Attorney, Agent, or Firm* — Cantor Colburn LLP

(57) ABSTRACT

A system and method for controlling a rotor of an aircraft is disclosed. A desired rotor speed for the rotor is received and a torque command that generates the received rotor speed is calculated. A fuel adjustment signal is calculated based on the torque command and a dynamic rotor measurement of the aircraft. The fuel adjustment signal is provided to the aircraft to track the rotor speed to the desired rotor speed.

10 Claims, 3 Drawing Sheets

MODEL FOLLOWING CONTROL FOR TORQUE AND ROTOR SPEED

CROSS REFERENCE TO RELATED APPLICATION

This application claims priority from U.S. Provisional Application Ser. No. 62/422,224, filed on Nov. 15, 2016, the contents of which are incorporated herein by reference in their entirety.

STATEMENT OF FEDERAL SUPPORT

This invention was made with government support with the United States Army under Contract No.: W911W6-14-2-0005. The government therefore has certain rights in this invention.

BACKGROUND OF THE INVENTION

The present invention is directed to a system and method for flying a rotary wing aircraft having a coaxial main rotor assembly and, in particular, to controlling a rotor torque and rotor speed of the aircraft.

Rotary wing aircraft such as helicopters include a main rotor assembly having a rotor and rotor blades that sits atop a fuselage of the aircraft. An engine or electric motor of the aircraft applies a torque to the rotor in order to cause the rotor to rotate at a selected rotor speed, thereby providing lift to the aircraft. Current flight control systems for rotary wing aircraft generate and pass a suitable rotor speed reference value to an engine or electric motor control system which makes the actual rotor speed track the reference value. Such flight control systems are suitable for tracking slow changes in rotor speed. However, faster changes in rotor speed, such as those changes that occur at the on-set of aggressive aircraft maneuvering, cannot be accommodated by these flight control systems.

SUMMARY OF THE INVENTION

According to one embodiment of the present invention, a method of controlling a rotor of an aircraft includes: receiving a desired rotor speed for the rotor; calculating a torque command that generates the received rotor speed; calculating a fuel adjustment signal based on the torque command and a dynamic rotor measurement of the aircraft; and providing the fuel adjustment signal to the aircraft to track the rotor speed to the desired rotor speed.

According to another embodiment of the present invention, a system for controlling a rotor speed of an aircraft includes: a reference model for determining a reference value for a dynamic parameter of a rotor of the aircraft from a torque command indicative of a desired rotor speed; a sensor for obtaining a dynamic rotor measurement of the aircraft; and a feedback model for determining a fuel adjustment signal from a difference between the reference value and the dynamic rotor measurement, wherein the fuel adjustment signal is supplied to the aircraft to track the rotor speed to the desired rotor speed.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
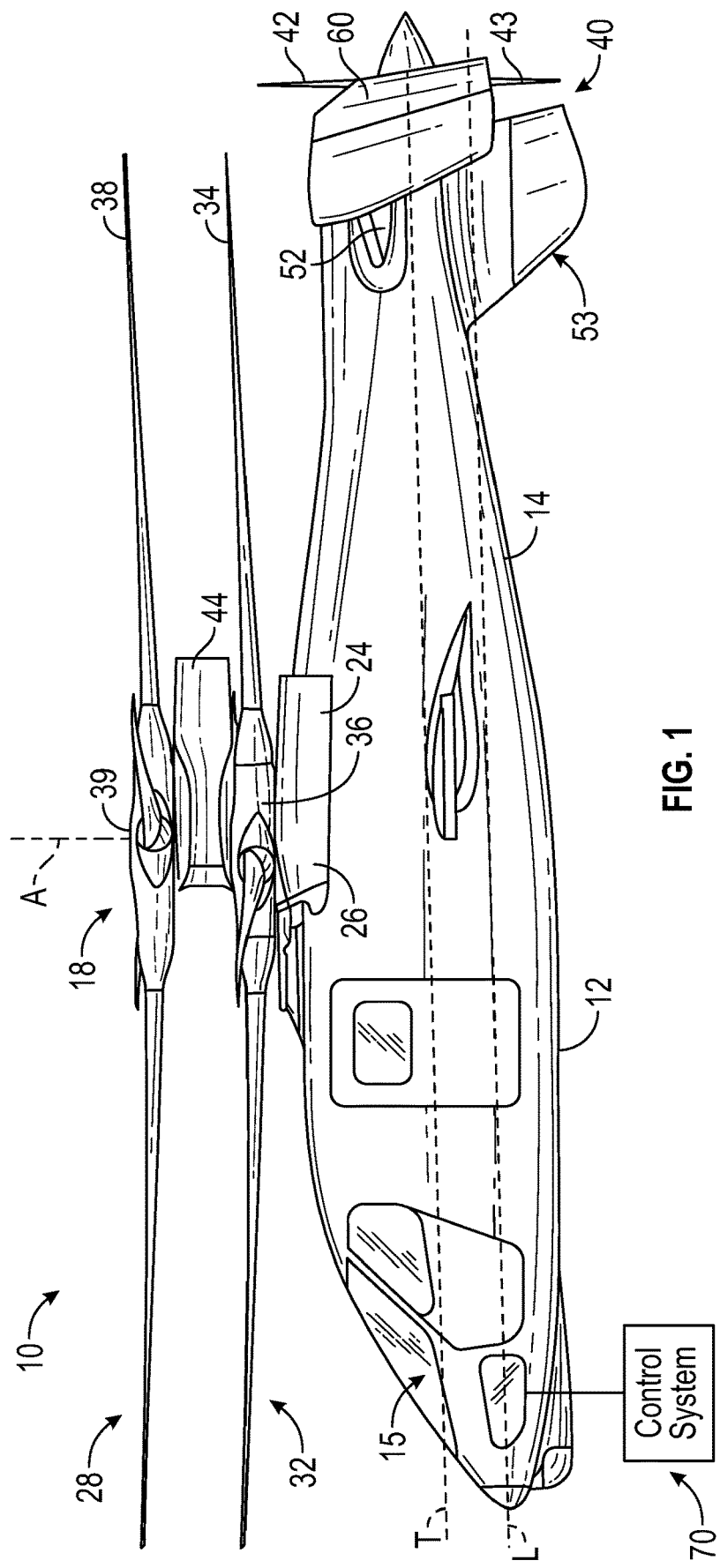
FIGS. 1 and 2 depict an exemplary embodiment of a rotary wing, vertical takeoff and land (VTOL) aircraft.
Figure 2:
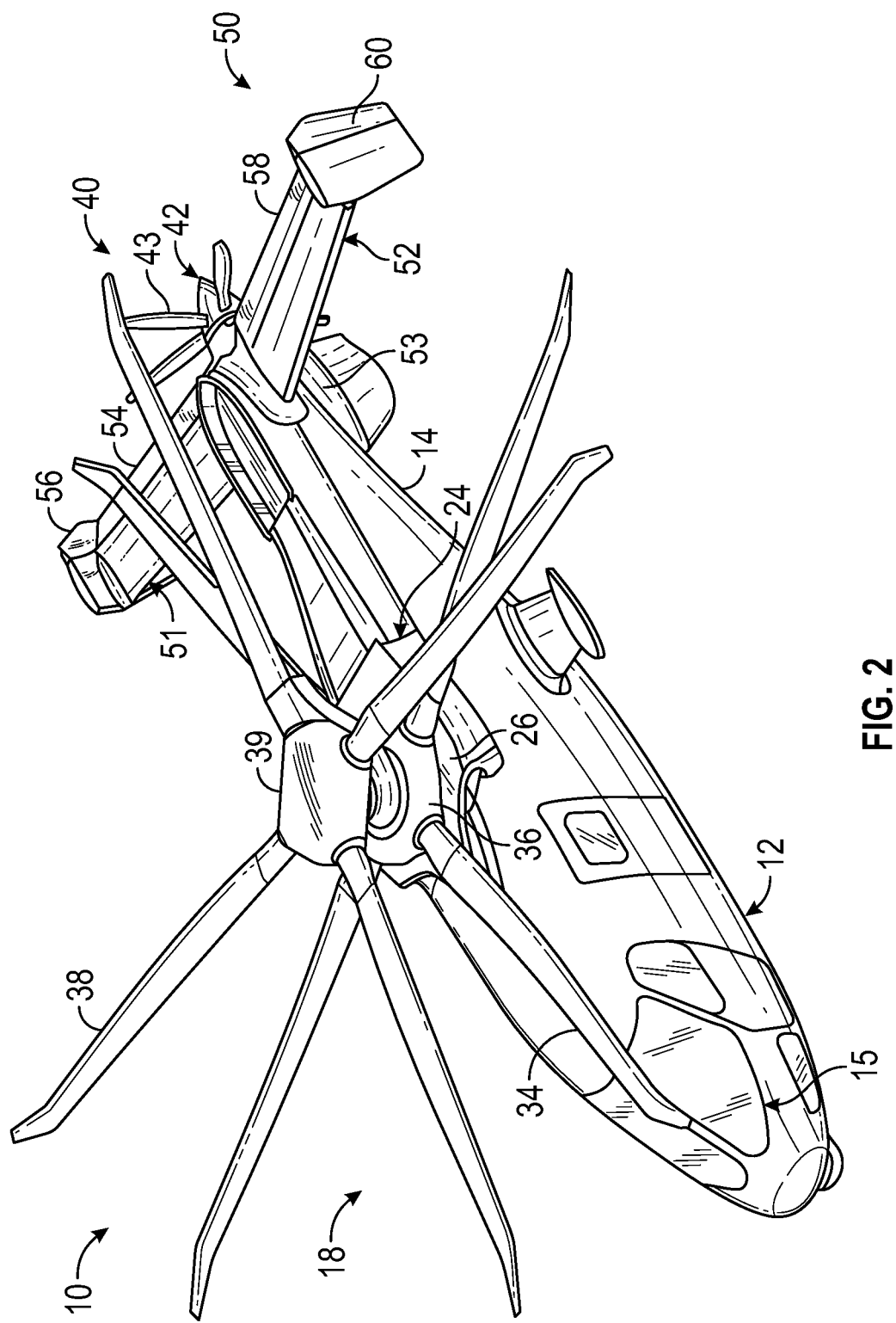

Referring now to the Figures, where the invention will be described with reference to specific embodiments, without limiting same, FIGS. 1 and 2 depict an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes a cockpit 15 having two seats for flight crew (e.g., pilot and co-pilot) and six seats for passengers (not shown). Main rotor assembly 18 is driven by a power source, for example, one or more motors 24 via a gearbox 26. In various embodiments, a motor can include an electric motor, a piston engine, a gas turbine or other device for providing motion. Main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Upper rotor assembly 28 includes a first plurality of rotor blades 34 supported by a first rotor hub 36. Lower rotor assembly 32 includes a second plurality of rotor blades 38 supported by a second rotor hub 39. The first plurality of rotor blades 34 rotate through a first rotor disk and the second plurality of rotor blades 38 rotate through a second rotor disk. In some embodiments, the aircraft 10 further includes a translational thrust system 40 having a propeller 42 located at the extending tail 14 to provide translational thrust (forward or rearward) for aircraft 10. Propeller 42 includes a plurality of blades 43.

Main rotor assembly 18 includes a rotor hub fairing 44 generally located between and around the upper and lower rotor assemblies 28 and 32 such that rotor hub 36 and rotor hub 39 are at least partially contained therein. Rotor hub fairing 44 provides drag reduction. First plurality of rotor blades 34 is connected to rotor hub 36 in a hingeless manner, also referred to as a rigid rotor system. Similarly, second plurality of rotor blades 38 is connected to rotor hub 39 in a hingeless manner. In accordance with an aspect of the exemplary embodiment, upper and lower rotor assemblies 28 and 32 rotate about a fixed axis. Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors.

Propeller 42, or translational thrust system 40, is connected to, and driven by, the motor 24 via the gearbox 26. Translational thrust system 40 may be mounted to the rear of the airframe 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to, or instead of, translational thrust. It should be understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 3:
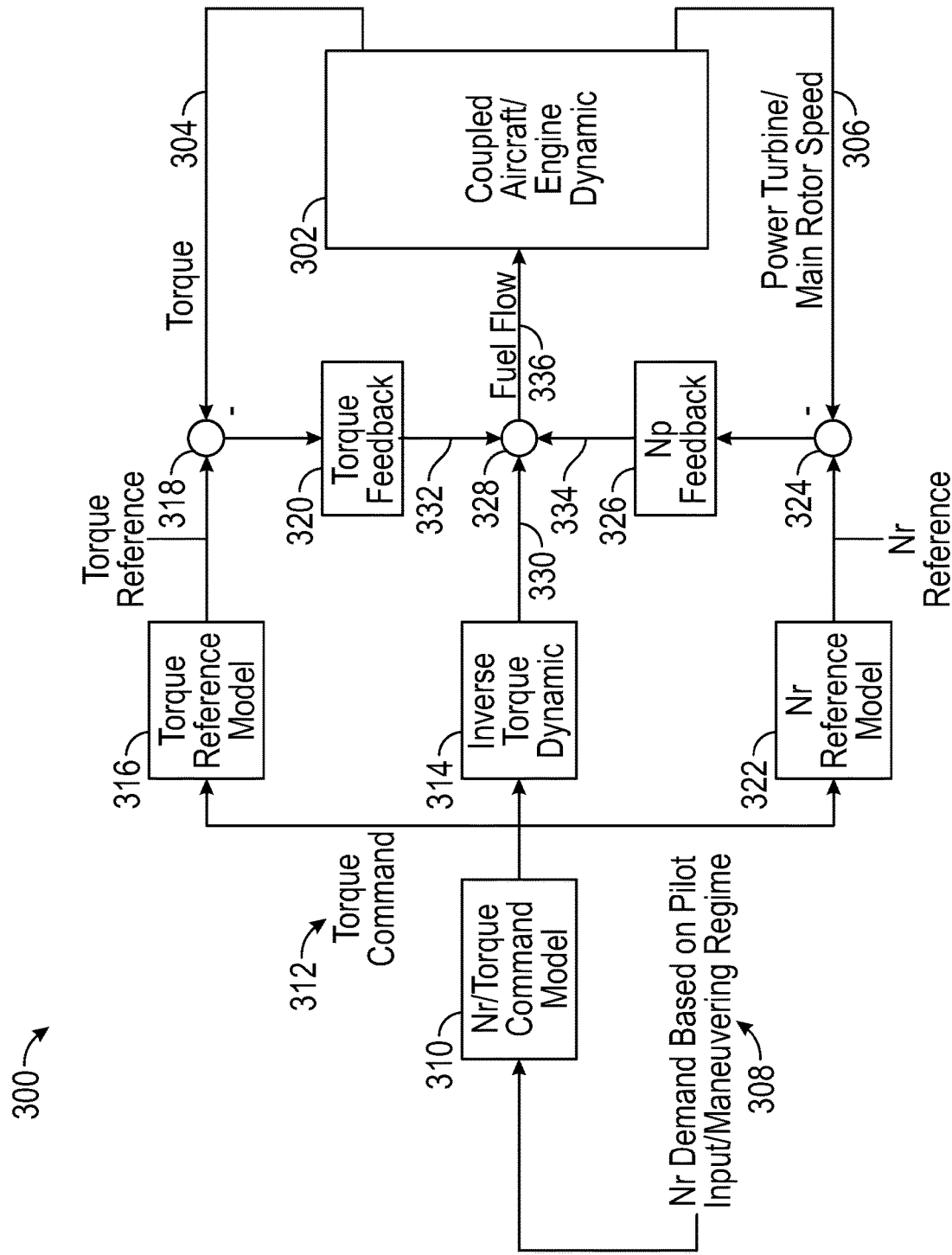
FIG. 3 shows a schematic diagram of a model following flight control system for flying the aircraft of FIGS. 1 and 2.

Aircraft 10 includes a control system 70 for controlling flight of the aircraft 10. The control system 70 includes a processor (not shown) that executes a flight control system such as discussed below with respect to FIG. 3, in one embodiment FIG. 3 shows a schematic diagram of a model following flight control system 300 for flying aircraft 10 of FIGS. 1 and 2 so as to control a torque and/or rotor speed of the aircraft 10. The system 300 includes a coupled aircraft/motor dynamic 302 that includes the motor of the aircraft as well as the flight dynamic elements of the aircraft, such as the rotor assembly, rotor blades, propellers, etc. For an aircraft 10 powered by an engine, the aircraft/motor dynamic 302 also includes a fuel pump for providing fuel to the engine. A total fuel flow signal 336 is provided to the fuel pump to control an amount of fuel that is provided to the engine, thereby controlling an amount of torque that is provided to the rotor of the aircraft and the resultant rotor speed. For an aircraft 10 powered by an electric motor, the aircraft/motor dynamic 302 also includes a battery for providing electrical power to the electric motor and the total fuel flow signal 336 is a signal for controlling an amount of voltage and/or current at the electric motor. The aircraft/motor dynamic 302 also includes sensors for measuring one or more dynamic parameters of the aircraft, such as a measured torque value 304 of the rotor and a measured rotor speed value 306, for example.

The flight control system 300 includes a rotor speed/torque command model 310 that generates a torque command upon receiving a pilot input 308. The pilot can enter a flight command to the rotor speed-torque command model 310 at an interface of the aircraft, such as an inceptor or other interface. The pilot's input can include, for example, a desired flight speed of the aircraft as well as a desired rotor speed. The rotor speed/torque command model 310 determines a torque command 312 for the aircraft rotor that provides the desired flight speed or rotor speed indicated by the pilot's input. The torque command 312 is provided to various models that generate fuel signals. The fuel signals are combined to provide a total fuel flow signal 336 that is provided to the aircraft/motor dynamic 302 to fly the aircraft. The total fuel flow signal is calculated to allow the aircraft/motor dynamic 302 to quickly respond to the pilot's input 308 and to track the actual rotor speed of the aircraft to the desired rotor speed.

The torque command 312 is provided to an inverse torque dynamic model 314 which determines a primary fuel signal 330 for generating a rotor speed and/or torque at the aircraft/motor dynamic 302. The primary fuel signal 330 can be an electrical signal that is provided to a fuel pump of the aircraft/motor dynamic 302 to provide an appropriate fuel flow to the motor. The torque command 312 is also used to generate one or more fuel adjustment signals that are used to adjust (up or down) the primary fuel signal 330 provided by the inverse torque dynamic model 314. The fuel adjustments signals include a torque-based fuel adjustment signal 332 and a rotor speed-based fuel adjustment signal 334.

In order to generate the torque-based fuel adjustment signal 332, the torque command 312 is provided to a torque reference model 316. The torque reference model 316 determines a torque reference value from the torque command that indicates an expected torque on the rotor due to application of the torque command at the aircraft/motor dynamic 302. A torque difference circuit 318 compares the torque reference value to an actual or measured torque value 304 of the aircraft/motor dynamic 302 to produce a torque error signal. The torque error signal is a difference between the torque reference value and the measured torque value 304. From the torque error signal, a torque feedback model 320 determines the torque-based fuel adjustment signal 332, i.e., an amount of fuel to align the actual torque with the torque reference value based on their difference.

In order to provide the rotor speed-based fuel adjustment signal 334, the torque command 312 is provided to a rotor speed reference model 322. The rotor speed reference model 322 determines a rotor speed reference value from the torque command 312. The rotor speed reference value indicates an expected rotor speed due to application of the torque command at the aircraft/motor dynamic 302. A rotor speed difference circuit 324 compares the rotor speed reference value to a measured rotor speed value 306 of the aircraft/motor dynamic 302 to produce a rotor speed error signal. The rotor speed error signal is a difference between the rotor speed reference value and the measured rotor speed value 306. From the torque error signal, a rotor speed feedback model 326 determines the rotor speed-based fuel adjustment signal 334, i.e., an amount of fuel to align the actual rotor speed with the rotor speed reference value based on their difference.

A summing circuit 328 sums the primary fuel signal 330, the torque-based fuel adjustment signal 332 and the rotor speed-based fuel adjustment signal 334 to obtain a total fuel flow signal 336. The total fuel flow signal 336 is provided to the fuel pump of the aircraft/motor dynamic 302 in order to cause the motor to rotate the rotor at a selected speed that tracks the desired rotor speed indicated by the pilot's input 308. Including the torque-based fuel adjustment signal 332 and the rotor speed-based fuel adjustment signal 334 in the total fuel flow signal 336 increases the responsiveness of the aircraft/motor dynamic 302 to the pilot's input command.

As used herein, the term "fuel" refers to any material that is provided to a motor of the aircraft to energize to the motor. For an embodiment in which the motor is an engine, the fuel may be a combustible material, while for an embodiment in which the motor is an electric motor, fuel refers to electrical power. Similarly, for embodiments in which the motor is an electrical motor, the "primary fuel signal" can be understood to refer to a primary electrical demand signal, "torque-based fuel adjustment signal" can be understood to be a torque-based electrical demand adjustment signal, "a rotor-based fuel adjustment signal" can be understood to be a rotor based electrical demand adjustment signal, and "total fuel flow signal" can be understood to be a total electrical demand signal. Calculations, communications or any other actions discussed herein as being taken with respect to fuel can be understood to refer to comparable calculations, communications or actions taken with respect to electrical demand. For an electrical motor, the total electrical demand signal can be used to operate a battery to provide the total electrical demand to the motor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of controlling a rotor of an aircraft, comprising:
    receiving a desired rotor speed for the rotor from an operator;
    calculating a torque command that generates the received rotor speed;
    calculating a primary fuel signal for applying the torque command at the rotor based on the torque command;
    calculating a torque reference value based on the torque command indicative of an expected torque on the rotor due to application of the torque command;
    calculating a torque-based fuel adjustment signal based on a difference between the torque reference value and a measured torque value of the rotor;
    adding the fuel adjustment signal to the primary fuel signal to obtain a total fuel flow signal; and
    providing the total fuel signal to the aircraft to rotate the rotor at the desired rotor speed.

2. The method of claim 1, further comprising determining a rotor speed-based fuel adjustment signal and adding the rotor speec-based fuel adjustment signal and the torque-based adjustment signal to the primary signal to obtain the total fuel flow signal.

3. The method of claim 2, further comprising determining the rotor speed-based fuel adjustment signal from a difference between a rotor speed reference value indicative of the torque command and a measured rotor speed value of the aircraft.

4. The method of claim 1, further comprising determining the torque command based on a received pilot input indicating a desired rotor speed.

5. The method of claim 1, wherein the aircraft includes a coaxial rotary-wing aircraft.

6. A system for controlling a rotor speed of an aircraft, comprising:
    an inverse torque dynamic model configured to calculate a primary fuel signal for applying a torque command at the rotor based on the torque command;
    a torque reference model for determining a reference value for a dynamic parameter of a rotor of the aircraft from a torque command indicative of a desired rotor speed;
    a sensor for obtaining a dynamic rotor measurement of the aircraft; and
    a torque feedback model for determining a torque-based fuel adjustment signal from a difference between the reference value and a measured torque value, wherein the fuel adjustment signal is added to the primary fuel signal to obtain a total fuel flow signal and the total fuel signal is supplied to the aircraft to rotate the rotate at the desired rotor speed.

7. The system of claim 6, further comprises a summing circuit that sums the primary fuel signal and the fuel adjustment signal to obtain the total fuel flow rate and provides the total fuel flow rate to the aircraft.

8. The system of claim 6, further comprising a rotor speed feedback model that supplies a rotor speed-based fuel adjustment signal.

9. The system of claim 8, wherein the rotor speed feedback model determines the rotor speed-based fuel adjustment signal from a difference between a rotor speed reference value indicative of the torque command and a measured rotor speed value of the aircraft.

10. The system of claim 6, further comprising a torque command model for determining the torque command based on a pilot input indicating the desired rotor speed.

* * * * *